United States Patent
Yoon

(10) Patent No.: US 10,281,624 B2
(45) Date of Patent: May 7, 2019

(54) RETRO-REFLECTIVE SHEET AND METHOD FOR MANUFACTURING THE SAME

(71) Applicant: Se Won Yoon, Gyeonggi-do (KR)

(72) Inventor: Se Won Yoon, Gyeonggi-do (KR)

(73) Assignee: Se Won Yoon, Gyeonggi-do (KR)

( * ) Notice: Subject to any disclaimer, the term of this patent is extended or adjusted under 35 U.S.C. 154(b) by 65 days.

(21) Appl. No.: 15/701,103

(22) Filed: Sep. 11, 2017

(65) Prior Publication Data
US 2018/0074237 A1    Mar. 15, 2018

(30) Foreign Application Priority Data

Sep. 13, 2016 (KR) .................. 10-2016-0117843

(51) Int. Cl.
| | |
|---|---|
| G02B 5/136 | (2006.01) |
| G02B 1/14 | (2015.01) |
| A41D 31/00 | (2019.01) |
| A43B 1/00 | (2006.01) |
| G02B 5/02 | (2006.01) |
| G02B 5/128 | (2006.01) |
| A43B 23/24 | (2006.01) |
| A41D 13/01 | (2006.01) |

(52) U.S. Cl.
CPC .......... G02B 5/136 (2013.01); A41D 31/0094 (2013.01); A43B 1/0036 (2013.01); A43B 1/0072 (2013.01); A43B 23/24 (2013.01); G02B 1/14 (2015.01); G02B 5/0242 (2013.01); G02B 5/128 (2013.01); A41D 13/01 (2013.01); A41D 31/0027 (2013.01)

(58) Field of Classification Search
CPC ........ G02B 5/136; G02B 1/14; G02B 5/0242; G02B 5/128; A41D 31/0094; A41D 13/01; A41D 31/0027; A43B 1/0036; A43B 23/24
USPC .......................................... 359/546
See application file for complete search history.

(56) References Cited

U.S. PATENT DOCUMENTS

| | | | | |
|---|---|---|---|---|
| 2017/0276844 A1* | 9/2017 | McCoy | .................. | G02B 5/128 |
| 2017/0293056 A1* | 10/2017 | Chen-Ho | ............... | G02B 5/128 |

FOREIGN PATENT DOCUMENTS

| | | |
|---|---|---|
| JP | 2007-121517 | 5/2007 |
| JP | 2014-164082 | 9/2014 |
| KR | 100935540 | 1/2010 |
| KR | 101206376 | 11/2012 |
| KR | 101571783 | 11/2015 |

\* cited by examiner

*Primary Examiner* — Euncha P Cherry
(74) *Attorney, Agent, or Firm* — IP & T Group LLP

(57) ABSTRACT

Disclosed are a retro-reflective sheet and a method for manufacturing the same. The retro-reflective sheet includes a first protective film, a first thermoplastic bonding layer, a first heat-resistant bonding layer, a colored layer, a light transmitting layer, a colored area allowing a portion of scattered light to be emitted to the outside through a first light condensing layer, a second protective film, a second thermoplastic bonding layer, a second heat-resistant bonding layer, a reflective layer, a reflective area reflecting light input through a second light condensing layer, and a base film.

16 Claims, 4 Drawing Sheets

# RETRO-REFLECTIVE SHEET AND METHOD FOR MANUFACTURING THE SAME

CROSS-REFERENCE TO RELATED APPLICATION(S)

The present application claims priority of Korean Patent Application No. 10-2016-0117843, filed on Sep. 13, 2016, which is incorporated herein by reference in its entirety.

BACKGROUND

Embodiments of the inventive concept described herein relate to a retro-reflective sheet and a method for manufacturing the same, and more particularly, to a retro-reflective body that may enhance visibility by improving light reflecting efficiency in a colored area at night, and a method for manufacturing the same.

A retro-reflective sheet is a reflective body that directly reflects incident light including a light condensing layer and a reflective layer in an incident direction. The retro-reflective sheet generally has a sheet shape, and is machined to have a desired pattern on a surface of a body of an attachment object to be attached to a road sign or a selected part of a uniform of a fireperson or the like through thermal fusion or sewing, thereby enhancing visibility such that it is easily displayed at a place, of which a surrounding environment is dark. Accordingly, if the retro-reflective sheet is attached to clothing of a person, who works on a road or at a dangerous place, such as a garbage collector, a fireperson, a policeperson, a laborer in a factory, a construction field worker, and a safety person in the field, protection and safety of the wearer may be effectively guaranteed by allowing the surrounding people to firmly identify a location of the wearer.

Further, the retro-reflective sheet has a stripe pattern shape that alternately formed with reflective areas in which a color area reflects light and thus may secure visibility even at night. The reflective area has a structure in which a light collecting layer is formed by attaching beads onto the reflective layer, on which metal such as aluminum is deposited, and the colored area includes a colored layer, on which an organic binder including a colored pigment having fluorescent or light accumulating characteristics is applied.

The retro-reflective sheet according to the related art is disclosed in Korean Patent No. 10-1206376 (entitled 'Method for Manufacturing Retro-reflective Sheet and').

The retro-reflective sheet according to the related art includes a base, a bonding layer formed on the base, a colored layer formed such that a non-reflective area is thicker than a reflective area so that a surface of the bonding layer is uneven and having a fluorescent function or a light accumulating function, or both of a fluorescent function and a light accumulating function, a reflective layer formed in the uneven part of the reflective area of the surface of the colored layer, and a light condensing layer formed on the reflective layer such that a plurality of beads are arranged.

In this case, the colored layer may selectively include a fluorescent pigment and a fluorescent material including a fluorescent pigment, or a light accumulating pigment and a light accumulating material including a light accumulating pigment, or may include a fluorescent material and a light accumulating material together to emit light through a fluorescence operation at night or emitting light that has been accumulated by absorbing light during the day or in the interior of a building, at night, thereby enhancing visibility at night or in a dark place. Further, if the colored layer includes a fluorescent material and a light accumulating material together, it may perform a fluorescence operation and a light accumulating operation at the same time. In this case, the light emitted from the colored layer has colors such as red (R), green (G), and blue (B) according to the fluorescent material or the light accumulating material.

A light reflecting member including the reflective layer and the light condensing layer is formed at the uneven part on the surface of the colored layer to reflect light input to the reflective area at night to the outside.

In this case, the light reflecting member including the reflective layer and the light condensing layer is formed in the uneven part formed in the reflective area on the colored layer so as not to be stepped from a surface of the colored layer of the non-reflective area so that the light reflecting member is prevented from being delaminated from the base.

In this case, the quantity of light reflected from the reflective area is approximately 500 cd/lux*m$^2$, and the quantity of light reflected from the colored area is not more than 30 cd/lux*m$^2$) Accordingly, when the widths of the reflective layer and the colored layer are the same, the quantity of light reflected from the retro-reflective sheet is approximately 265 cd/lux*m$^2$.

Accordingly, because the retro-reflective sheet according to the related art reflects a small quantity of light on the colored area except for the reflective area, it decreases visibility.

SUMMARY

Embodiments of the inventive concept provide a retro-reflective sheet that may improve visibility by increasing the quantity of light reflected on a colored area at night and thus increasing the quantity of light reflected from the retro-reflective sheet.

Embodiments of the inventive concept also provide a method for manufacturing a retro-reflective sheet that may improve visibility by increasing the quantity of light reflected on a colored area at night and thus increasing the quantity of light reflected from the retro-reflective sheet.

In accordance with an aspect of the inventive concept, there is provided a retro-reflective sheet including a first protective film, a first thermoplastic bonding layer formed on the first protective film, a first heat-resistant bonding layer formed on the first thermoplastic bonding layer, a colored layer formed on the first heat-resistant bonding layer, a light transmitting layer formed on the colored layer, a colored area including a first light condensing layer formed on the light transmitting layer and in which the light transmitting layer transmits light input through the first light condensing layer and scatters the input light on an interface with the colored layer such that a portion of the scattered light is emitted to the outside through the first light condensing layer, together with fluorescent light or light accumulated in the colored layer, a second protective film, a second thermoplastic bonding layer formed on the second protective film, a second heat-resistant bonding layer formed on the second thermoplastic bonding layer to have a thickness corresponding to a sum of the thicknesses of the first heat-resistant bonding layer and the colored layer, a reflective layer formed on the second heat-resistant bonding layer, a reflective area including a second light condensing layer formed on the reflective layer such that the reflective layer reflects light input to the reflective layer through the second light condensing layer, and a base film adhered onto the first light condensing layer and the second light condensing layer by a bead bonding layer.

The colored layer may be formed of a polyurethane-based resin, an ethylene vinyl acetate (EVA) copolymer, a polyester-based resin, a meta acryl-based resin, or an acryl copolymer.

The colored layer may selectively include any one of a fluorescent material or a light accumulating material, or may include a fluorescent material and a light accumulating material together.

The light transmitting layer may be formed of $SiO_2$, indium tin oxide (ITO), tin oxide (TO), indium zinc oxide (IZO), $TiO_2$, ZnS, ZnO, $Al_2O_3$, or $CeO_2$.

The light transmitting layer may be formed of a plurality of layers of two or more of $SiO_2$, indium tin oxide (ITO), tin oxide (TO), indium zinc oxide (IZO), $TiO_2$, ZnS, ZnO, $Al_2O_3$, or $CeO_2$.

The light transmitting layer may be deposited to have a thickness of 100 to 3000 Å.

The second heat-resistant bonding layer has a thickness corresponding to a sum of the first heat-resistant bonding layer and the colored layer.

In accordance with another aspect of the inventive concept, there is provided a method for manufacturing a retro-reflective sheet, the method including forming a first light condensing layer including a first bead arranging layer and a plurality of beads, on a first carrier film, sequentially laminating a light transmitting layer, a colored layer, a first heat-resistant bonding layer, a first thermoplastic bonding layer, and a first protective film, on a surface of the first light condensing layer, removing the first carrier film and the first bead arranging layer such that the first light condensing layer is exposed, forming a first configuration by forming a bead adhering layer on a separate base film and adhering the first light condensing layer, and defining a colored area and a reflective area by half-cutting parts from the first protective film to the first light condensing layer and removing the parts from the first protective film to the first light condensing layer such that a partial area of the bead adhering layer is exposed in a stripe pattern shape, forming a second light condensing layer including a second bead arranging layer and a plurality of beads, on a second carrier film, forming a second configuration by sequentially laminating a light transmitting layer, a second heat-resistant bonding layer, a second thermoplastic bonding layer, and a second protective film, on a surface of the second light condensing layer, separating the second configuration into a plurality of sections in a stripe pattern shape having a width of the reflective area and removing the second carrier film and the second bead arranging layer such that the second light condensing layer is exposed, and exposing the second light condensing layer by removing the second carrier film and the second bead arranging layer of the second configuration separated to have the width of the reflective area, and adhering the exposed second light condensing layer to the bead adhering layer of the reflective area of the first configuration.

The colored layer may be formed of a polyurethane-based resin, an ethylene vinyl acetate (EVA) copolymer, a polyester-based resin, a meta acryl-based resin, or an acryl copolymer.

The colored layer selectively may include any one of a fluorescent material or a light accumulating material, or includes a fluorescent material and a light accumulating material together.

The light transmitting layer may be formed of $SiO_2$, indium tin oxide (ITO), tin oxide (TO), indium zinc oxide (IZO), $TiO_2$, ZnS, ZnO, $Al_2O_3$, or $CeO_2$.

The light transmitting layer may be formed of a plurality of layers of two or more of $SiO_2$, indium tin oxide (ITO), tin oxide (TO), indium zinc oxide (IZO), $TiO_2$, ZnS, ZnO, $Al_2O_3$, or $CeO_2$.

The light transmitting layer may be deposited to have a thickness of 100 to 3000 Å.

The second heat-resistant bonding layer may have a thickness that is the same as a sum of the thicknesses of the first heat-resistant bonding layer and the colored layer.

The first and second bead arranging layers may be formed of an ethylene vinyl acetate (EVA) copolymer, an ethylene (EAA) copolymer, polyethylene (LDPE, LLDPE, or HDPE), polypropylene, or a poly acryl copolymer.

The bead adhering layer may be formed by applying an acryl-based resin, an SBR-based resin, a rubber-based resin, or a silicon-based resin.

In accordance with another aspect of the inventive concept, there is provided a method for manufacturing a retro-reflective sheet, the method including forming a first light condensing layer including a first bead arranging layer and a plurality of beads, on a first carrier film, forming a first configuration by sequentially laminating a light transmitting layer, a colored layer, a first heat-resistant bonding layer, a first thermoplastic bonding layer, and a first protective film, on a surface of the first light condensing layer, separating the first configuration into a plurality of sections in a stripe pattern shape having a width of the colored area and removing the first carrier film and the first bead arranging layer such that the first light condensing layer is exposed, forming a second light condensing layer including a second bead arranging layer and a plurality of beads, on a second carrier film, forming a second configuration by sequentially laminating a reflective layer, a second heat-resistant bonding layer, a second thermoplastic bonding layer, and a second protective film, on a surface of the second light condensing layer, separating the second configuration into a plurality of sections in a stripe pattern shape having a width of the reflective area and removing the second carrier film and the second bead arranging layer such that the second light condensing layer is exposed, and forming a bead adhering layer on a base film and sequentially mounting the first and second light condensing layers such that the first and second light condensing layers are adhered to the bead adhering layer at left parts of the first and second configurations.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, the inventive concept will be described in detail with reference to the accompanying drawings.

Figure 1:
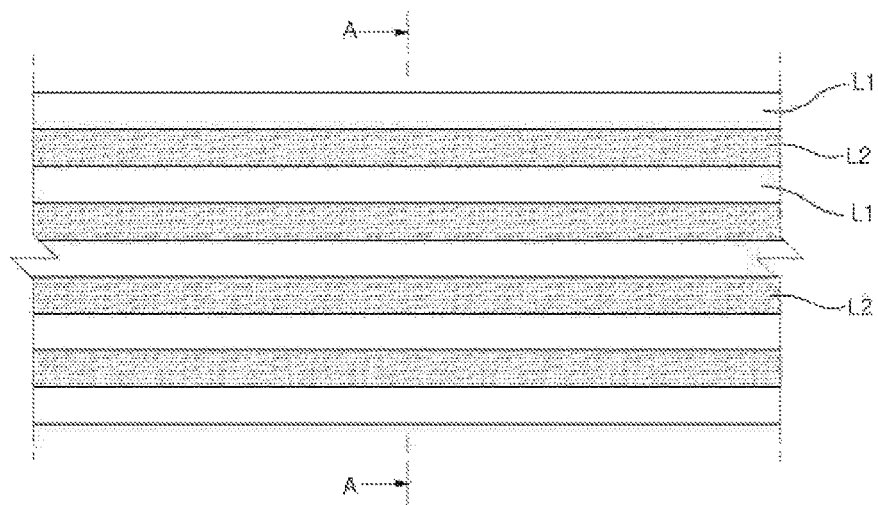
FIG. 1 is a plan view of a retro-reflective sheet according to an embodiment of the inventive concept.
Figure 2:
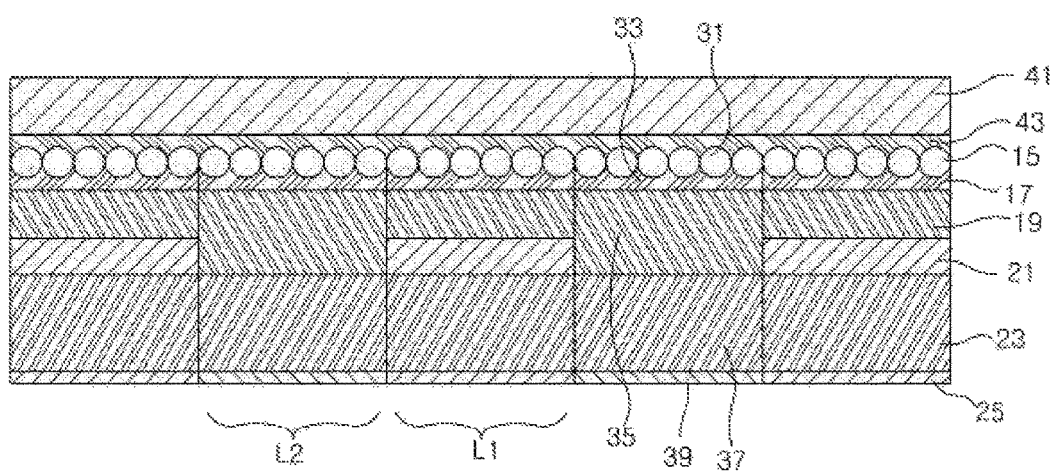
FIG. 2 is a sectional view taken along line A-A of FIG. 1.

FIG. 1 is a sectional view of a retro-reflective sheet according to the inventive concept. FIG. 2 is a sectional view taken along line A-A of FIG. 1.

In the retro-reflective sheet according to the inventive concept, colored areas L1 and reflective areas L2 are alternately formed to have a stripe pattern shape, and a bead adhering layer 43 and a base film 41 are formed on the colored areas L1 and the reflective areas L2.

The colored area L1 includes a first protective film 25, a first thermoplastic bonding layer, a first heat-resistant bonding layer 21, a colored layer 19, a light transmitting layer 17, and a first light condensing layer 15, and the reflective area L2 includes a second protective film 39, a second thermoplastic bonding layer 37, a second heat-resistant bonding layer 35, a reflective layer 33, and a second light condensing layer 31.

In this case, the first protective film 25 of the colored area L1 is formed of a polyolefin film to prevent the first thermoplastic bonding layer 23 from being contaminated.

The first thermoplastic bonding layer 23 is attached on a surface of a product, such as clothing or shoes, through thermal fusion, and is formed of a thermoplastic resin, such as polyester, polyurethane, polyacryl, polyolefin, thermoplastic elastomer (TPE), or thermoplastic polyurethane (TPU) to have a thickness of 300 to 500 μm.

The first heat-resistant bonding layer 21 is formed on the first thermoplastic bonding layer 23. In this case, the first heat-resistant bonding layer 21 includes an adhesive including a liquid synthetic resin, such as a polyurethane resin, a polyester resin, or an acryl resin, and an heat-resistant material, and is coated through a method, such as comma coating, gravure coating, micro-gravure coating, or slot die head coating to have a thickness of about 100 to 300 μm. The first heat-resistant bonding layer 21 includes a heat-resistant material, such as aluminum hydroxide, a phosphorous-based heat-resistant material, $Sb_2O_3$, a Br-based heat-resistant material, or a melamine-based heat-resistant material to have heat-resistant characteristics.

The colored layer 19 is coated with a bonding synthetic resin, such as a polyurethane-based resin, an ethylene vinyl acetate (EVA) copolymer, a polyester-based resin, a meta acryl-based resin, or an acryl copolymer, through a method, such as comma coating, gravure coating, micro-gravure coating, or slot die head coating.

In this case, the colored layer 19 selectively includes any one of a fluorescent pigment and a fluorescent material including a fluorescent pigment, and a light accumulating pigment and a light accumulating material including a light accumulating pigment to have a thickness of 100 to 500 μm. Further, the colored layer 19 may include a fluorescent material and a light accumulating material together.

Therefore, the quantity of light reflected on the colored layer 19 at night or at a dark place becomes not more than 30 cd/lux*$m^2$ because the colored layer 19 emits light due to an fluorescence operation at night or absorbs light during the day or in the interior of a building to emit light at night. Further, if the colored layer 19 includes a fluorescent material and a light accumulating material together, it may perform a fluorescence operation and a light accumulating operation at the same time. In this case, the light emitted from the colored layer 19 has colors such as red (R), green (G), and blue (B) according to the fluorescent material or the light accumulating material.

The light transmitting layer 17 is formed o the colored layer 19. In this case, the light transmitting layer 17 is formed by depositing a metal having an excellent light transmittance, such as $SiO_2$, indium tin oxide (ITO), tin oxide (TO), indium zinc oxide (IZO), $TiO_2$, ZnS, ZnO, $Al_2O_3$, or $CeO_2$, through evaporation, chemical vapor deposition (CVD), sputtering, or ion-beaming to have a thickness of 100 to 3000 Å. In this case, while transmitting light input through the first light condensing layer 15, which will be described below, through a transparent thin film without shielding the light, the light transmitting layer 17 scatters the transmitted light on an interface with the colored layer 19. Accordingly, a portion of the light scattered on the interface of the light transmitting layer 17 and the colored layer 19 is emitted through the first light condensing layer 15 to the colored layer 19 like fluorescent or accumulated light. Accordingly, the quantity of the light emitted through the first light condensing layer 15 formed in the colored area L1 increases to about 200 cd/lux*$m^2$ as light reflected on the colored layer 19 and light scattered on the interface of the colored layer 19 and the light transmitting layer 17 emerge so that the visibility of the colored layer 19 is improved.

Further, the light transmitting layer 17 may include a plurality of layers including two or more of $SiO_2$, indium tin oxide (ITO), tin oxide (TO), indium zinc oxide (IZO), $TiO_2$, ZnS, ZnO, $Al_2O_3$, or $CeO_2$, for example, two layers of $SiO_2$ and $TiO_2$. In this case, the reflective indexes of $SiO_2$ and $TiO_2$ that constitutes the light transmitting layer 17 have different values, for example, about 1.43 to 1.45 and about 1.7 to 1.9, respectively. Accordingly, the quantity of the light that is input through the first light condensing layer 15 and then is scattered increases on the interfaces of the plurality of layers constituting the light transmitting layer 17, for example, on the interface between an $SiO_2$ layer and a $TiO_2$ layer, as well as on the interface of the light transmitting layer 17 and the colored layer 19. Accordingly, because a portion of the scattered light is emitted through the first light condensing layer 15 together with fluorescent or accumulated light, the quantity of the scattered light increases only on an interface of the light transmitting layer 17 and the colored layer 19 so that the visibility of the colored layer 19 is further enhanced.

Further, the first light collecting layer 15 is formed such that a plurality of beads are scatted on the light transmitting layer 17. In this case, the plurality of beads constituting the first light condensing layer 15 is adapted to condense incident light, and is formed of glass having sizes of 20 to 200 μm, transparent non-glass ceramic, or a transparent synthetic resin.

In this case, the first primer layer (not illustrated) may be formed between the light transmitting layer 17 and the first light condensing layer 15. The first primer layer is adapted to smoothly adhere metal during a deposition process for forming the light transmitting layer 17 in the first light condensing layer 15, and has to be transparent to prevent loss of light that is input to the light transmitting layer 17 through the first light condensing layer 15.

The reflective area L2 includes a second protective film 39, a second thermoplastic bonding layer 37, a second heat-resistant bonding layer 35, a reflective layer 33, and a second light condensing layer 31.

In this case, the second protective film 39 of the reflective area L2 is formed of a polyolefin film to prevent the first thermoplastic bonding layer 23 from being contaminated, like the first protective film 25.

The second thermoplastic bonding layer 37 is attached on a surface of a product, such as clothing or shoes, through thermal fusion, and is a sheet formed of a thermoplastic resin, such as polyester, polyurethane, polyacryl, polyolefin, thermoplastic elastomer (TPE), or thermoplastic polyurethane (TPU) to have a thickness of 300 to 500 μm, which is substantially the same as that of the first thermoplastic bonding layer 23.

The second heat-resistant bonding layer 35 is formed on the second thermoplastic bonding layer 37. In this case, the second heat-resistant bonding layer 35 is formed by mixing an heat-resistant material with an adhesive including a liquid synthetic resin, such as a polyurethane resin, a polyester resin, or an acryl resin. The second heat-resistant bonding layer 35 includes an heat-resistant material, such as aluminum hydroxide, a phosphorous-based heat-resistant material, $Sb_2O_3$, a Br-based heat-resistant material, or a melamine-based heat-resistant material to have heat-resistant characteristics.

In this case, the second heat-resistant bonding layer 35 is formed through a coating method, such as comma coating, gravure coating, micro gravure coating, or slot die head coating, to have a thickness that is similar to a sum of the thicknesses of the first heat-resistant bonding layer 21 and the colored layer 19, that is, a thickness of about 200 to 800 μm. Accordingly, because a sum of the thicknesses of the second thermoplastic bonding layer 37 and the second heat-resistant bonding layer 35 of the reflective area L2 is substantially the same as a sum of the thicknesses of the colored layer 19, the first heat-resistant layer 21, and the first thermoplastic bonding layer 23 of the colored area L1, lamination is prevented by preventing the second thermoplastic bonding layer 37 and the first thermoplastic bonding layer 23 from being stepped. Further, a side surface of the second heat-resistant bonding layer 35 is bonded to a side surface of the first heat-resistant bonding layer 21, and is prevented from being separated from the first heat-resistant bonding layer 21.

The reflective layer 33 is formed by depositing a metal having excellent light reflection characteristics, such as Al, Ag, Cu, Zn, or Sn. In this case, the reflective layer 33 is adapted to reflect light input from the outside to the outside again, and may be formed in a thin film shape by depositing a metal, such as Al, Ag, Cu, Zn, or Sn, through a method such as evaporation, chemical vapor deposition (CVD), sputtering, or ion-beaming Because the reflection characteristics of the reflective layer 33 lowers if the thickness of the reflective layer 33 is smaller than 100 Å, it is preferable that the reflective layer 33 be deposited to have a thickness of 100 to 3000 Å. In this case, the quantity of light reflected on the reflective layer 33 becomes approximately 500 cd/lux*$m^2$.

The second light condensing layer 31 is formed such that a plurality of beads are scattered to form a layer. In this case, the plurality of beads constituting the second light condensing layer 31 is adapted to condense incident light, and is formed of glass having sizes of 20 to 200 μm, transparent non-glass ceramic, or a transparent synthetic resin.

In this case, the second primer layer (not illustrated) may be formed between the reflective layer 33 and the second light condensing layer 31. The second primer layer is adapted to smoothly adhere metal during a deposition process for forming the reflective layer 33 in the second light condensing layer 31, and has to be transparent to prevent loss of light that is input to the reflective layer 33 through the second light condensing layer 31.

A bead adhering layer 43 and a base film 41 are formed on the first light condensing layer 15 and the second light condensing layer 31. In this case, the base film 41 is adapted to prevent the first light condensing layer 15 and the second light condensing layer 31 from being damaged when the manufactured retro-reflective sheet is preserved or attached to an attachment body, and is formed of a synthetic resin, such as polyester. Further, the bead adhering layer 43 is adapted to adhere the first light condensing layer 15 and the second light condensing layer 31 to the base film 41, and is formed by applying an adhesive, such as an acryl-based resin, an SBR-based resin, a rubber-based resin, or a silicon-based resin.

The above-configured retro-reflective sheet according to the inventive concept is attached through thermal pressing while the first thermoplastic bonding layer 23 and the second thermoplastic bonding layer 37 contact a surface of a product, such as clothing or sneakers in a state in which the protective film 39 is removed. In this case, the base film 41 prevents the first light condensing layer 15 and the second light condensing layer 31 from being damaged during the thermal pressing. Further, after the thermal pressing, the base film 41 is removed together with the bead adhering layer 43.

Further, in the retro-reflective sheet according to the inventive concept, the light transmitting layer 17 formed in the colored area L1 transmits light that passed through the first light condensing layer 15, and the light that passed through the first light condensing layer 15 is scattered on an interface with the colored layer 19. A portion of the light scatter on the surface of the first light condensing layer 15 and the colored layer 19 is emitted to the outside through the first light condensing layer 15 together with the fluorescent light or the accumulated light. The quantity of the light emitted through the first light condensing layer 15 is obtained as a portion of the light scattered on the interface of the first light condensing layer 15 and the fluorescent light or the light accumulated in the colored layer 19 merge, and is approximately 200 cd/lux*$m^2$.

Accordingly, in the retro-reflective sheet according to the inventive concept, the light is reflected on the reflective layer 33 of the reflective area L2 so that the quantity of light corresponding to approximately 500 cd/lux*$m^2$ is emitted through the second light condensing layer 31, and the quantity of light corresponding to 200 cd/lux*$m^2$ is emitted through the first light condensing layer 15 of the colored area L1. Accordingly, in the retro-reflective sheet according to the inventive concept, the quantity of light reflected when the widths of the reflective area L2 and the colored area L1 are the same becomes approximately 350 cd/lux*$m^2$, which is higher at night.

Further, according to the inventive concept, the light transmitting layer 17 includes a plurality of layers of two or more layers of transparent thin films so that the light is scattered on an interface between the transparent thin films as well as on an interface with the colored layer 19, and thus the quantity of light corresponding to approximately 400 dc/lux*m2 is emitted. Accordingly, when the light transmitting layer 17 includes two or more layers, for example, two layers and the widths of the reflective area L2 and the colored area L1 are the same, the quantity of reflected light is approximately 450 cd/lux*$m^2$ so that visibility is improved at night than when the light transmitting layer 17 includes one layer.

Table 1 represents a difference of the quantities of light of the inventive concept and the related art. The unit is cd/lux*$m^2$.

TABLE 1

|  | Related art | Light transmitting layer of one layer | Light transmitting layer of two layers |
|---|---|---|---|
| Reflective part | 500 | 500 | 500 |
| Colored part | 30 | 200 | 400 |
| Average | 255 | 350 | 450 |

Further, although the colored area L1 and the reflective area L2 have stripe pattern shapes in the inventive concept, various shapes, such as waveforms or saw-tooth shapes, may be continuously formed in the lengthwise direction of the sheet.

FIGS. 3A to 3F are views of processes of manufacturing a retro-reflective sheet according to an embodiment.

Figure 3A:
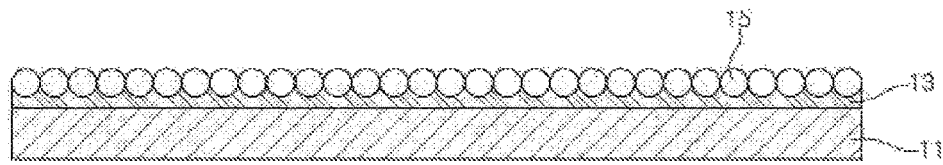
FIGS. 3A to 3F are views of processes of manufacturing a retro-reflective sheet according to an embodiment.

Referring to FIG. 3A, a first bead arranging layer 13 is formed on a first carrier film 11. In this case, the first carrier film 11 is formed of a synthetic resin, such as polyester. Further, the first bead arranging layer 13 is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer.

A first light condensing layer 15 is formed by scattering a plurality of beads on the first bead arranging layer 13. In this case, the first light condensing layer 15 is formed by attaching the plurality of scattered beads to only a portion of the first bead arranging layer 13, for example, a narrow area of the first bead arranging layer 13 without intermediate parts of the beads are not buried. In this case, the plurality of beads constituting the first light condensing layer 15 may be formed of glass having sizes of 20 to 200 µm, transparent non-glass ceramic, or a transparent synthetic resin.

Figure 3B:
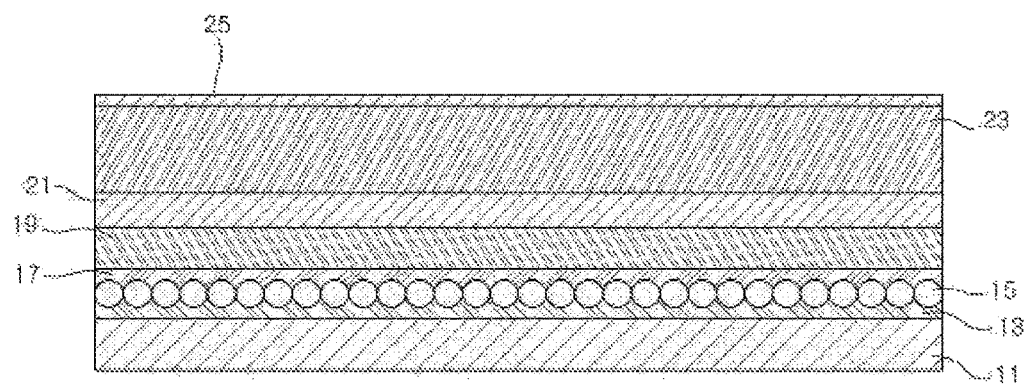

Referring to FIG. 3B, a light transmitting layer 17 is formed on a surface of the first light condensing layer 15. In this case, the light transmitting layer 17 is formed by depositing a metal having an excellent light transmittance, such as $SiO_2$, indium tin oxide (ITO), tin oxide (TO), indium zinc oxide (IZO), $TiO_2$, ZnS, ZnO, $Al_2O_3$, or $CeO_2$, through a deposition method such as evaporation, chemical vapor deposition (CVD), sputtering, or ion-beaming to have a thickness of 100 to 3000 Å. In this case, because the first bead arranging layer 13 is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer, a solvent is not volatilized when the light transmitting layer 17 is formed and thus degradation of vacuum degree may be prevented. Accordingly, the light transmitting layer 17 may be easily formed. The light transmitting layer 17 is a transparent thin film and transmits light input through the first light condensing layer 15 without shielding the light.

In this case, although the light transmitting layer 17 is formed of one layer of, for example, $SiO_2$, indium tin oxide (ITO), tin oxide (TO), indium zinc oxide (IZO), $TiO_2$, ZnS, ZnO, $Al_2O_3$, or $CeO_2$, it may be formed of a plurality of layers of two or more of $SiO_2$, indium tin oxide (ITO), tin oxide (TO), indium zinc oxide (IZO), $TiO_2$, ZnS, ZnO, $Al_2O_3$, or $CeO_2$, for example, two layers of $SiO_2$ and $TiO_2$ in the inventive concept.

In this case, because the reflective indexes of $SiO_2$ and $TiO_2$ constituting the light transmitting layer 17 have different values, for example, approximately 1.43 to 1.45 and approximately 1.7 to 1.9, respectively, the quantity of the light that is input through the first light condensing layer 15 and scattered light increases even on the interfaces of the plurality of layers if the light transmitting layer 17 has a plurality of layers.

Further, a primer layer (not illustrated) may be formed first before the light transmitting layer 17 is formed on a surface of the first light condensing layer 15. In this case, the first primer layer is adapted to smoothly adhere metal during a deposition process for forming the light transmitting layer 17, and has to be transparent to prevent loss of light that is input to the light transmitting layer 17 through the first light condensing layer 15.

Further, a colored layer 19 is formed on the light transmitting layer 17. In this case, the colored layer 19 is coated with a bonding synthetic resin, such as a polyurethane-based resin, an ethylene vinyl acetate (EVA) copolymer, a polyester-based resin, a meta acryl-based resin, or an acryl copolymer, which includes a fluorescent or accumulated pigment, through a method, such as comma coating, gravure coating, micro-gravure coating, or slot die head coating so that the colored layer 19 has a thickness of approximately 100 to 500 µm. In this case, the colored layer 19 selectively includes any one of a fluorescent pigment and a fluorescent material including a fluorescent pigment, and a light accumulating pigment and a light accumulating material including a light accumulating pigment. Further, the colored layer 19 may include a fluorescent material and a light accumulating material together.

Further, a first heat-resistant bonding layer 21 is formed on the colored layer 19. In this case, the first heat-resistant bonding layer 21 includes an adhesive including a liquid synthetic resin, such as a polyurethane resin, a polyester resin, or an acryl resin, and a heat-resistant material, and is coated through a method, such as comma coating, gravure coating, micro-gravure coating, or slot die head coating to have a thickness of about 100 to 300 µm. In this case, the first heat-resistant bonding layer 21 includes a heat-resistant material, such as aluminum hydroxide, a phosphorous-based heat-resistant material, $Sb_2O_3$, a Br-based heat-resistant material, or a melamine-based heat-resistant material to have inflammability characteristics.

Next, the first thermoplastic bonding layer 23 is formed on the first heat-resistant bonding layer 21. In this case, the first thermoplastic bonding layer 23 is adapted to attach the manufactured retro-reflective sheet onto a surface of a product, such as clothing or shoes, through thermal fusion, and is a sheet formed of a thermoplastic resin, such as polyester, polyurethane, polyacryl, polyolefin, thermoplastic elastomer (TPE), or thermoplastic polyurethane (TPU) to have a thickness of 300 to 500 µm.

Further, a first protective film 25 is formed on the first thermoplastic bonding layer 23. In this case, the first protective film 25 is formed of a polyolefin film to prevent the first thermoplastic bonding layer 23 from being contaminated.

Figure 3C:
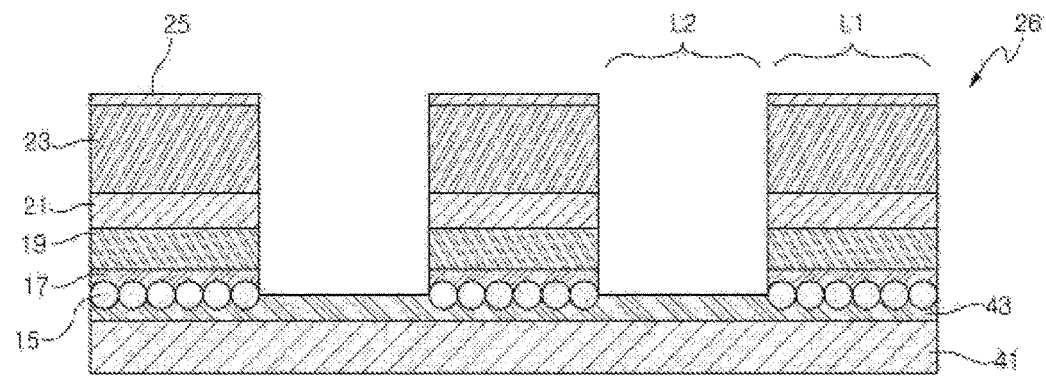

Referring to FIG. 3C, the first carrier film 11 is removed. Then, the first bead arranging layer 13 is also removed together with the first carrier film 11 such that the first light condensing layer 15 is exposed. In this case, because the plurality of beads scattered in the first bead arranging layer 13 are attached not in a wide area but in a narrow area, the first bead arranging layer 13 and the first light condensing layer 15 are easily separated.

Further, the bead adhering layer 43 is formed on a separate film, that is, the base film 41. In this case, the base film 41 may be formed of the same synthetic resin as that of the first carrier film 11, such as polyester. Further, the bead adhering layer 43 is formed by applying an adhesive, such as an acryl-based resin, an SBR-based resin, a rubber-based resin, or a silicon-based resin.

A first configuration 26 is completely manufactured by adhering the exposed first light condensing layer 15 onto the bead adhering layer 43. Further, the first configuration defines 26 the colored area L1 and the reflective area L2. In this case, the colored area L1 and the reflective area L2 may be defined by half-cutting the first configuration 26 from the first protective film 25 to the first light condensing layer 15, and removing a partial area of the first configuration 26 such that the bead adhering layer 43 of the reflective area L2 is exposed to have a stripe pattern shape.

Figure 3D:
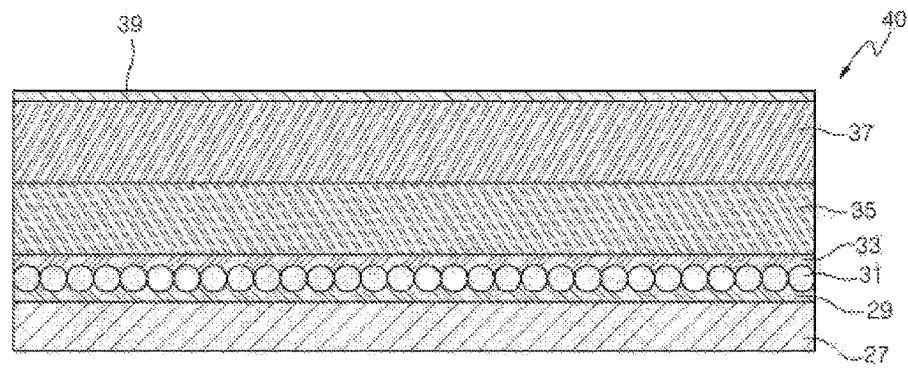

Referring to FIG. 3D, as illustrated in FIG. 2A, a second bead arranging layer 29 and a second light condensing layer 31 are sequentially formed on the second carrier film 27. In this case, the second carrier film 27 is formed of a synthetic resin, such as polyester, like the first carrier film 11, and the second bead arranging layer 29 is formed of a thermoplastic synthetic resin, such as such as an ethylene vinyl acetate (EVA) copolymer, an ethylene (EAA) copolymer, polyethylene (LDPE, LLDPE, or HDPE), polypropylene, or a poly acryl copolymer, like the first bead arranging layer 13.

Further, the second light condensing layer 31 is formed by scattering a plurality of beads on the second bead arranging layer 29 like the first light condensing layer 15. In this case, the second light condensing layer 31 may be formed on the second bead arranging layer 29 like the first light condensing layer 15. In this case, the plurality of beads constituting second light condensing layer 31 may be formed of glass having sizes of 20 to 200 µm, transparent non-glass ceramic, or a transparent synthetic resin.

Next, a reflective layer 33 is formed on a surface of the second light condensing layer 31. The reflective layer 33 is formed by depositing a metal having excellent light reflection characteristics, such as Al, Ag, Cu, Zn, or Sn, through a method, such as evaporation, chemical vapor deposition (CVD), sputtering, or ion-beaming. In this case, the reflective layer 33 is adapted to reflect the light input from the outside to the outside again, and because the reflection characteristics of the reflective layer 33 lowers if the thickness of the reflective layer 33 is smaller than 100 Å, it is preferable that the reflective layer 33 be deposited to have a thickness of 100 to 3000 Å. In this case, because the second bead arranging layer 29 is formed of a thermoplastic synthetic resin, such as an ethylene vinyl acetate (EVA) copolymer, an ethylene (EAA) copolymer, polyethylene (LDPE, LLDPE, or HDPE), polypropylene, or a poly acryl copolymer, like the first bead arranging layer 13, a solvent is not volatilized when the reflective layer 33 is formed and thus degradation of vacuum degree may be prevented. Accordingly, the reflective layer 33 may be easily formed.

In this case, a second primer layer (not illustrated) may be formed first before the reflective layer 33 is formed on a surface of the second light condensing layer 31. In this case, the second primer layer is adapted to smoothly adhere metal during a deposition process for forming the reflective layer 33, and has to be transparent to prevent loss of light that is input to the light transmitting layer 17 through the second light condensing layer 31.

Further, a second heat-resistant bonding layer 35 is formed on the reflective layer 33. In this case, the second heat-resistant bonding layer 35 includes an adhesive including a liquid synthetic resin, such as a polyurethane resin, a polyester resin, or an acryl resin, and a heat-resistant material, like the first heat-resistant bonding layer 21, and is coated through a method, such as comma coating, gravure coating, micro-gravure coating, or slot die head coating, like the first heat-resistant bonding layer 21. The second heat-resistant bonding layer 35 is formed to have a thickness corresponding to a sum of the thicknesses of the colored layer 19 and the first heat-resistant bonding layer 21, that is, a thickness of 200 to 800 µm. In this case, the second heat-resistant bonding layer 35 includes an heat-resistant material, such as aluminum hydroxide, a phosphorous-based heat-resistant material, $Sb_2O_3$, a Br-based heat-resistant material, or a melamine-based heat-resistant material to have inflammability characteristics.

Next, the second thermoplastic bonding layer 37 is formed on the second heat-resistant bonding layer 35. In this case, the second thermoplastic bonding layer 37 is adapted to attach the manufactured retro-reflective sheet onto a surface of a product, such as clothing or shoes, through thermal fusion, like the second thermoplastic bonding layer 23, and is a sheet formed of a thermoplastic resin, such as polyester, polyurethane, polyacryl, polyolefin, thermoplastic elastomer (TPE), or thermoplastic polyurethane (TPU) to have a thickness of 300 to 500 µm, like the first thermoplastic bonding layer 23.

Further, a second configuration 40 is completely manufactured by forming a second protective film 39 on the second thermoplastic bonding layer 37. In this case, the second protective film 40 is formed of a polyolefin film to prevent the first thermoplastic bonding layer 37 from being contaminated, like the first protective film 25.

Figure 3E:
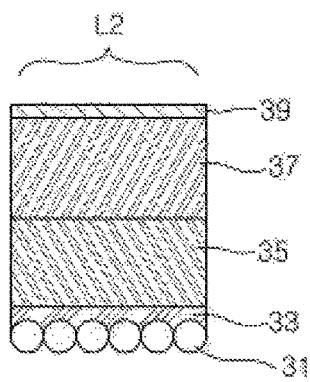

Referring to FIG. 3E, the second configuration 40 is separated into a plurality of sections in a stripe pattern shape to have a width of the reflective area L2. Further, the second carrier film 27 is removed through the same method as the method of removing the first carrier film 11 from the one having a stripe pattern shape to have a width of the reflective area L2. Then, the second bead arranging layer 29 is also removed together with the second carrier film 27 such that the second light condensing layer 31 is exposed.

Figure 3F:
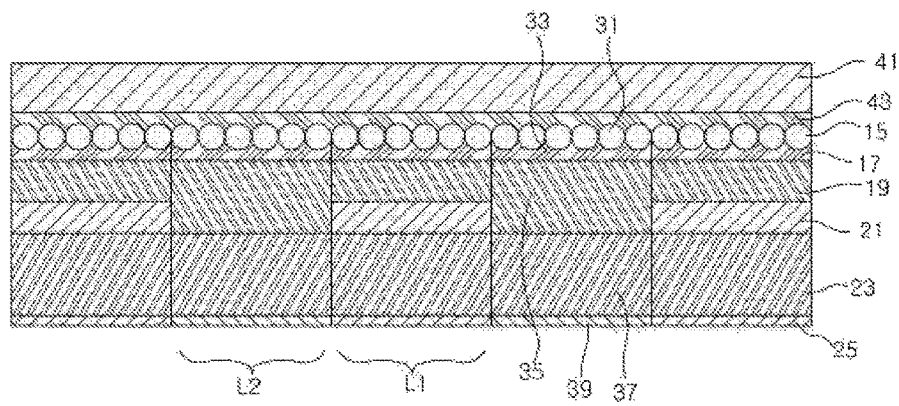

Referring to FIG. 3F, the separated one of the second configuration 40 is inserted into the reflective area L2 of the first configuration 26. That is, by inserting the second configuration 40, from which the second carrier film 27 and the second bead arranging layer 29 are removed, between the colored areas L1, and the exposed second light condensing layer 31 is adhered onto the bead adhering layer 43. Then, because a sum of the thicknesses of the second thermoplastic bonding layer 37 and the second heat-resistant bonding layer 35 of the reflective area L2 is substantially the same as a sum of the thicknesses of the colored layer 19, the first heat-resistant layer 21, and the first thermoplastic bonding layer 23 of the colored area L1, lamination is prevented by preventing the second thermoplastic bonding layer 37 and the first thermoplastic bonding layer 23 from being stepped. Further, a side surface of the second heat-resistant bonding layer 35 and a side surface of the first heat-resistant bonding layer 21 are bonded to each other, and thus the retro-reflective sheet is finished.

Figure 4A:
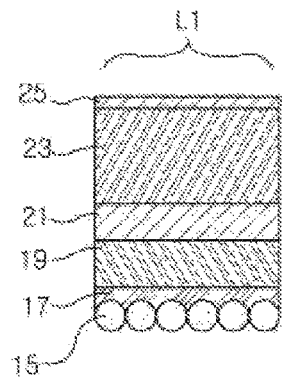
FIGS. 4A to 4C are views of processes of manufacturing a retro-reflective sheet according to an embodiment.
Figure 4B:
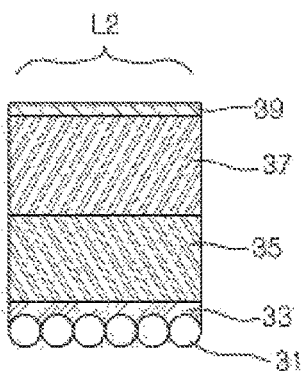
Figure 4C:
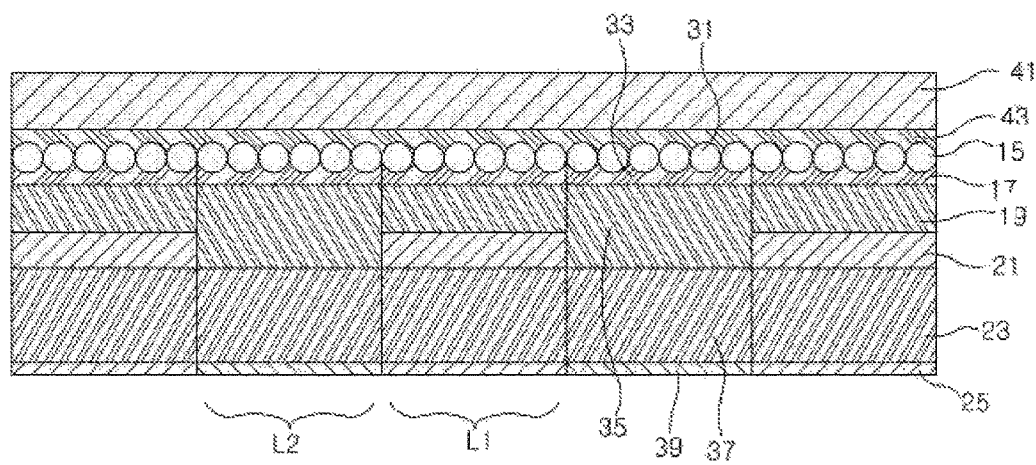

FIGS. 4A to 4C are views of processes of manufacturing a retro-reflective sheet according to an embodiment.

Referring to FIG. 4A, the first configuration 26 as in FIG. 3B is formed by performing the same processes of FIGS. 3A and 3B. Further, the first configuration 26 as in FIG. 3B is separated into a plurality of sections to have a width of the colored area L1 in a stripe pattern shape, and the first carrier film 11 is removed. Then, the first bead arranging layer 13 is also removed together with the first carrier film 11 such that the first light condensing layer 15 is exposed.

Referring to FIG. 4B, the second configuration 40 is formed by performing the same processes of that of FIG. 3D.

Further, the second configuration 40 is separated into a plurality of sections to have a width of the reflective area L2 in a stripe pattern shape, and the second carrier film 27 is removed. Then, the second bead arranging layer 29 is also removed together with the second carrier film 27 such that the second light condensing layer 31 is exposed.

Referring to FIG. 4C, the bead adhering layer 43 is formed on a separate base film 41. In this case, the base film 41 may be formed of the same synthetic resin as that of the first and second carrier films 11 and 27, such as polyester. Further, the bead adhering layer 43 is formed by applying an adhesive, such as an acryl-based resin, an SBR-based resin, a rubber-based resin, or a silicon-based resin.

Further, the first configuration 26 separated to have a stripe pattern shape to have a width of the colored area L1 on the base film 41 and the second configuration 40 separated to have a stripe pattern shape to have a width of the reflective area L2 are arranged alternately and sequentially. That is, the first configuration 26 and the second configuration 40 separated to have a stripe pattern shape on the base film 41 are mounted alternately and sequentially such that the first light condensing layer 15 and the second light condensing layer 31 are adhered to the bead adhering layer 43 so that the colored area L1 and the reflective area L2 are defined. In this case, because the first configuration 26 and the second configuration 40 separated to have a stripe pattern shape are mounted alternately and sequentially, the process is easily performed. Then, a side surface of the second heat-resistant bonding layer 35 and a side surface of the first heat-resistant bonding layer 21 are bonded to each other, and thus the retro-reflective sheet is finished.

Therefore, according to the inventive concept, visibility may be improved by increasing the quantity of light reflected on a colored area at night and thus increasing the quantity of light reflected from the retro-reflective sheet.

It will be noted by those skilled in the art to which the inventive concept pertains that the inventive concept is not limited by the above-described embodiments and the accompanying drawings but may be variously substituted, modified, and changed without departing from the spirit of the inventive concept.

What is claimed is:

1. A retro-reflective sheet comprising:
    a first protective film;
    a first thermoplastic bonding layer formed on the first protective film;
    a first heat-resistant bonding layer formed on the first thermoplastic bonding layer;
    a colored layer formed on the first heat-resistant bonding layer;
    a light transmitting layer formed on the colored layer;
    a colored area including a first light condensing layer formed on the light transmitting layer and in which the light transmitting layer transmits light input through the first light condensing layer and scatters the input light on an interface with the colored layer such that a portion of the scattered light is emitted to the outside through the first light condensing layer, together with fluorescent light or light accumulated in the colored layer;
    a second protective film;
    a second thermoplastic bonding layer formed on the second protective film;
    a second heat-resistant bonding layer formed on the second thermoplastic bonding layer to have a thickness corresponding to a sum of the thicknesses of the first heat-resistant bonding layer and the colored layer;
    a reflective layer formed on the second heat-resistant bonding layer;
    a reflective area including a second light condensing layer formed on the reflective layer such that the reflective layer reflects light input to the reflective layer through the second light condensing layer; and
    a base film adhered onto the first light condensing layer and the second light condensing layer by a bead bonding layer.

2. The retro-reflective sheet of claim 1, wherein the colored layer is formed of a polyurethane-based resin, an ethylene vinyl acetate (EVA) copolymer, a polyester-based resin, a meta acryl-based resin, or an acryl copolymer.

3. The retro-reflective sheet of claim 1, wherein the colored layer selectively includes any one of a fluorescent material or a light accumulating material, or includes a fluorescent material and a light accumulating material together.

4. The retro-reflective sheet of claim 1, wherein the light transmitting layer is formed of $SiO_2$, indium tin oxide (ITO), tin oxide (TO), indium zinc oxide (IZO), $TiO_2$, ZnS, ZnO, $Al_2O_3$, or $CeO_2$.

5. The retro-reflective sheet of claim 1, wherein the light transmitting layer is formed of a plurality of layers of two or more of $SiO_2$, indium tin oxide (ITO), tin oxide (TO), indium zinc oxide (IZO), $TiO_2$, ZnS, ZnO, $Al_2O_3$, or $CeO_2$.

6. The retro-reflective sheet of claim 1, wherein the light transmitting layer is deposited to have a thickness of 100 to 3000 Å.

7. A method for manufacturing a retro-reflective sheet, the method comprising:
    forming a first light condensing layer including a first bead arranging layer and a plurality of beads, on a first carrier film;
    sequentially laminating a light transmitting layer, a colored layer, a first heat-resistant bonding layer, a first thermoplastic bonding layer, and a first protective film, on a surface of the first light condensing layer;
    removing the first carrier film and the first bead arranging layer such that the first light condensing layer is exposed;
    forming a first configuration by forming a bead adhering layer on a separate base film and adhering the first light condensing layer, and defining a colored area and a reflective area by half-cutting parts from the first protective film to the first light condensing layer and removing the parts from the first protective film to the first light condensing layer such that a partial area of the bead adhering layer is exposed in a stripe pattern shape;
    forming a second light condensing layer including a second bead arranging layer and a plurality of beads, on a second carrier film;
    forming a second configuration by sequentially laminating a light transmitting layer, a second heat-resistant bonding layer, a second thermoplastic bonding layer, and a second protective film, on a surface of the second light condensing layer;
    separating the second configuration into a plurality of sections in a stripe pattern shape having a width of the reflective area and removing the second carrier film and the second bead arranging layer such that the second light condensing layer is exposed; and
    exposing the second light condensing layer by removing the second carrier film and the second bead arranging layer of the second configuration separated to have the width of the reflective area, and adhering the exposed second light condensing layer to the bead adhering layer of the reflective area of the first configuration.

8. The method of claim 7, wherein the colored layer is formed of a polyurethane-based resin, an ethylene vinyl acetate (EVA) copolymer, a polyester-based resin, a meta acryl-based resin, or an acryl copolymer.

9. The method of claim 7, wherein the colored layer selectively includes any one of a fluorescent material or a light accumulating material, or includes a fluorescent material and a light accumulating material together.

10. The method of claim 7, wherein the light transmitting layer is formed of $SiO_2$, indium tin oxide (ITO), tin oxide (TO), indium zinc oxide (IZO), $TiO_2$, ZnS, ZnO, $Al_2O_3$, or $CeO_2$.

11. The method of claim 7, wherein the light transmitting layer is formed of a plurality of layers of two or more of $SiO_2$, indium tin oxide (ITO), tin oxide (TO), indium zinc oxide (IZO), $TiO_2$, ZnS, ZnO, $Al_2O_3$, or $CeO_2$.

12. The method of claim 11, wherein the light transmitting layer is deposited to have a thickness of 100 to 3000 Å.

13. The method of claim 7, wherein the second heat-resistant bonding layer has a thickness that is the same as a sum of the thicknesses of the first heat-resistant bonding layer and the colored layer.

14. The method of claim 7, wherein the first and second bead arranging layers are formed of an ethylene vinyl acetate (EVA) copolymer, an ethylene (EAA) copolymer, polyethylene (LDPE, LLDPE, or HDPE), polypropylene, or a poly acryl copolymer.

15. The method of claim 7, wherein the bead adhering layer is formed by applying an acryl-based resin, an SBR-based resin, a rubber-based resin, or a silicon-based resin.

16. A method for manufacturing a retro-reflective sheet, the method comprising:

forming a first light condensing layer including a first bead arranging layer and a plurality of beads, on a first carrier film;

forming a first configuration by sequentially laminating a light transmitting layer, a colored layer, a first heat-resistant bonding layer, a first thermoplastic bonding layer, and a first protective film, on a surface of the first light condensing layer;

separating the first configuration into a plurality of sections in a stripe pattern shape having a width of the colored area and removing the first carrier film and the first bead arranging layer such that the first light condensing layer is exposed;

forming a second light condensing layer including a second bead arranging layer and a plurality of beads, on a second carrier film;

forming a second configuration by sequentially laminating a reflective layer, a second heat-resistant bonding layer, a second thermoplastic bonding layer, and a second protective film, on a surface of the second light condensing layer;

separating the second configuration into a plurality of sections in a stripe pattern shape having a width of the reflective area and removing the second carrier film and the second bead arranging layer such that the second light condensing layer is exposed; and forming a bead adhering layer on a base film and sequentially mounting the first and second light condensing layers such that the first and second light condensing layers are adhered to the bead adhering layer at left parts of the first and second configurations.

\* \* \* \* \*